INVENTOR
GLENN J. BARRETT
BY
his ATTORNEYS

Patented June 30, 1931

1,812,130

UNITED STATES PATENT OFFICE

GLENN J. BARRETT, OF EVANSTON, ILLINOIS, ASSIGNOR TO PORTABLE ADDING MACHINE COMPANY, OF NEW YORK, N. Y., A CORPORATION OF ILLINOIS

ADDING AND LISTING MACHINE

Original application filed August 14, 1925, Serial No. 50,219. Divided and this application filed January 18, 1930. Serial No. 421,738.

One object of the invention is to provide a simple and efficient calculating mechanism for key-set adding and listing machines.

Other objects of the invention are to provide a simple and compact calculating mechanism especially suitable for use in a small portable adding and listing machine; to provide a calculating mechanism wherein the transfer of tens from one decimal order unit to the next higher decimal order unit of the accumulator in adding is effected in an efficient manner by very simple means; to simplify the construction by mounting on the main shaft of the machine the adding sectors, type segments, and a control bail therefor all for oscillatory movement about said shaft, and providing means for driving the bail from the shaft in timed relation to oscillatory movements of the shaft; to provide a restoring bail adapted to restore the active adding units on the return stroke of the handle for driving the accumulator wheels during adding operations, and to reset to normal position at the end of the forward stroke of the handle idle adding sectors that have moved to tens-transfer position during a previous adding operation, to thereby permit restoration of the transfer control devices to normal position before the next adding action of the adding sectors on the accumulator wheels takes place; to provide means for insuring full throw of the control bail for the adding and printing sectors.

To the foregoing and other ends, which will hereinafter appear, the invention consists in the features of construction, arrangements of elements, and combinations of parts specified in the appended claims.

The improvements in preferred form have been illustrated in connection with a portable key-set adding and listing machine more fully shown and described in my co-pending application, Serial No. 50,219, filed August 14, 1925, of which application the present application is a division. Only so much of the machine shown and described in said co-pending application as its necessary for a full understanding of the improvements claimed in the present application is shown and described herein.

In the appended drawings:

Fig. 9ª a detail view of the locking bail for the key latch strips and the means for shifting said bail to release position;

This machine is provided with a base plate 1 and two main frame side plates 5 and 6 suitably supported by the base plate. The frame plates 5 and 6 support the entire mechanism of the machine, except the ribbon mechanism, not shown, which in this machine is supported on the cover casing.

Accumulator driving units

The accumulator driving or adding units are rotatably mounted upon the main shaft 68, to which the handle 196 is secured as hereinafter described, and include driver elements 69, in the form of type segments carrying types 70, and adding sectors 79 driven from the type segments. The numeral types 70 are formed on narrow type strips, concentrically mounted on arcuate flanges on the rear edges of driver elements or type segments 69, the types being fixed thereon in order from "0" to "9" from top to bottom and adapted to be printed from by movement of the platen against the type segments, as described in application, Serial Number 50,219. The type segments or driver elements 69 of the accumulator driving units are provided with upwardly projecting stop lugs 71 normally engaged behind ears 72 bent laterally from the rear ends of the stop levers 37 to hold the "0" types one space below the printing line of the machine. The arrangement is such that when keys 18 are set the ears 72 are lifted sufficiently to clear the ends of the stop lugs 71, thereby permitting rotation of the accumulator driving units in counter-clockwise direction as viewed from the right when the handle 196 is rocked forward. The type segments and adding sectors are preferably mounted in condensed form, that is so that the spacing of the segments corresponds to the spacing of the digits of the printed numbers and, since the decimal order rows of keys 18 are spaced farther apart than is required for the type segments, the rear ends of the stop levers 37 are bent inward to bring the ears 72 thereof into cooperative relation with the accumulator driving unit stop lugs 71. The driver element type segments 69 are secured to hubs 73 which are formed with pulley grooves, for driving springs 74 which pass over the hubs and are attached to pins 75 secured to the respective driving elements 69. The opposite ends of the springs 74 are carried forward and anchored in holes 76 in a cross-bar 77 extending between the side plates 5 and 6 and supported thereby. It will be seen that by this arrangement the driving elements 69 of the adding or accumulator driving units are urged in counter-clockwise direction as viewed from the right by the action of the springs 74, but are normally prevented from such movement by stop levers 37 and a restoring bail 294 hereinafter described. The desired driving elements 69 may be freed for such movement upon rearward swinging of bail 294 by the depression of the keys in the keyboard which would lift the stop levers 37 associated with key rows in which keys are depressed.

The hubs 73 of the driving elements 69 extend a short distance on the right hand side of the latter to form bearing bosses 78 upon which adding sectors 79 are rotatably mounted. The adding sectors are preferably spaced slightly from their associated driver-type segments 69 by annular beads, and are provided with elongated slots 80 through which headed rivets 81 on the segments or driving elements extend, thereby securing the adding sectors to the respective driving elements for independent rotation to the extent of one unit space. The driving elements 69 and the adding sectors 79 are resiliently connected together by springs 82, the arrangement being such that the springs 82 are adapted to move the adding sectors in one direction for transfer of the tens or the segments in the opposite direction to position "0" type at the printing line, as more fully described hereinafter.

The movements of the adding or accumulator driving units, after the stop levers 37 have been lifted by setting keys representing the number to be added, are adapted to be determined by the tail stops of the set numeral keys. For this purpose the adding sectors 79 are provided with pivot studs 83 to which links 84 are pivotally connected by bolts 85 with stop slides 86 each of which is provided with eight stop ears or lugs 87 and two stop shoulders 95 and 96 adapted to engage the tail stops of the keys 18. It has been previously pointed out that the accumulator driving units are mounted in condensed form, corresponding to the spacing required between the type segments and, therefore, the links 84 are bent or fan outwardly from their connections to adding sectors at their rear ends to their connections with the stop slides 86 which correspond with the spacing between rows of keys. The stop slides 86 are provided with elongated slots at 88 and 89 cooperating with annular grooves 90 in transversely extending rods 91 supported in the frame plates 5 and 6, the arrangement being such that the stop slides 86 are held in proper spaced relation and are freely slidable for differential positioning of the respective adding units according to a number set up on the keyboard. A transverse rod 91ª is supported in the frame plates 5 and 6 forwardly of the forward ends of the stop slides 86. This rod 91ª serves as an abutment for the slides and prevents their being accidentally moved forward far enough to disengage the slots 88 and 89 from the rods 91.

Accumulator unit

The adding sectors 79, which are adapted to cooperate with the pinion elements 108 of the accumulator or register wheels, are provided with segmental gear racks 107 formed concentrically with the main shaft 68 and normally in mesh with the teeth of the register wheel pinions 108 rotatably mounted on a transverse rod or shaft 109, the ends of which are supported in the side bars 110 of the accumulator unit rocking frame. The accumulator or register wheels comprise hubs 111 upon which the pinions 108 are mounted, the pinions being flanked on each side by outwardly flaring cupped disks 112 which are adapted to maintain registration between the thin sheet metal adding sector racks 107 and the respective register wheel pinions 108. On the left hand side faces of the hubs 111 there are preferably mounted rings 113, carrying single teeth 114 forming the triggers for operating the carrying pawls in the transfer of the tens. The triggers 114 are preferably slanting on one face and straight on the other and adapted to cooperate with ratchet toothlike noses 115 at the forward ends of carrying levers 116, which in my improvement are pivotally mounted on a transverse shaft 117 supported in the side bars 110 of the accumulator unit rocking frame, and therefore are movable bodily with the register wheels when the latter are moved out of and into engagement with the adding sector racks 107 by the control mechanism described in the said application, Serial Number 50,219. The rear ends 118 of the carrying levers are preferably provided with laterally extending ears 119 adapted to cooperate with forwardly projecting detent fingers 120 formed on the lower extremities of the respective adding sectors to control the transfer of the tens and normally adapted to arrest the return movement of the adding sectors shortly before the bail 294 completes the return movement of the type segments to tension transfer springs 82 and effect one space relative movement between the type segments and adding sectors which carries the zero types one space below the printing line. The accumulator unit rocking frame is mounted on a transversely extending rock shaft 121, the ends of which are journalled in the main frame side plates 5 and 6. The accumulator unit is adapted to be rocked with the shaft 121, as hereinafter described, for moving the register wheel pinions 108 into and out of mesh with the adding sector racks 107. Preferably the rock shaft 121 is provided with a plurality of notches 122 extending transversely of the axle of the shaft, into which the respective detent fingers 120 of the adding sectors are adapted to project for cooperation with the ears 119 on the carrying levers. It will be seen that by this construction the engagement between the carrying-lever ears 119 and the detent fingers 120 are brought close to the axle of rotation of the accumulator unit, so that the slight rocking motion thereof, in moving the register wheels into and out of cooperative relation with the adding sectors, will not materially affect the relation between the carrying lever ears 119 and the detent fingers 120 of the adding sectors.

The noses 115 of the carrying levers 116 are provided with cam bevel faces 123 for cooperation with the triggers 114 of the register wheels as the register wheel pinions 108 are rotated during normal addition. Opposite the cam faces the tooth-like noses 115 of the carrying levers are straight,—that is substantially radial as to the register wheels, to to form detent latches for engaging correspondingly radial faces on the triggers 114 when the register wheels are rotated in the opposite direction to reset the accumulator to zero or take the total. It will be understood that when the register wheel pinions 108 are rotated more than nine (9) units in counter-clockwise direction as viewed from the right, on the return stroke of handle 196 during addition, the triggers 114 will engage the bevel faces 123 on the ends of the carrying levers 116 and move the latter, so that the opposite ends 118 thereof will be moved out of the field of the detent fingers 120 thereby permitting the respective adding sectors to move in clockwise direction as viewed from the right an additional unit space under the pull of the transfer springs 82 for the transfer of the tens. It will be apparent, however, that frequently the adding sectors, and hence the detent fingers, will not have returned to the normal position at the time the carrying levers 116 are tripped by the triggers 114, and, therefore, means must be provided for holding the carrying levers 116 in tripped position until the transfer of the tens takes place. For this purpose the carrying levers 116 are provided with depending arms 124 formed with laterally projecting ears 125 which are adapted to cooperate with depending latch lugs 126 on latch pawls 127 pivotally mounted on a transverse shaft 128 supported in the side bars 110 of the accumulator rocking frame. Springs are required for restoring and resiliently holding the carrying levers 116 in position to be engaged by the triggers 114, and preferably for this purpose double-acting springs 129 are provided, which extend from holes 130 in the carrying levers 116 to pins 131 on the latch pawls 127, thereby also utilizing the springs for holding the latch pawls in engagement with the ears 125 when the carrying levers are displaced by the triggers.

Figures 9, 9A:
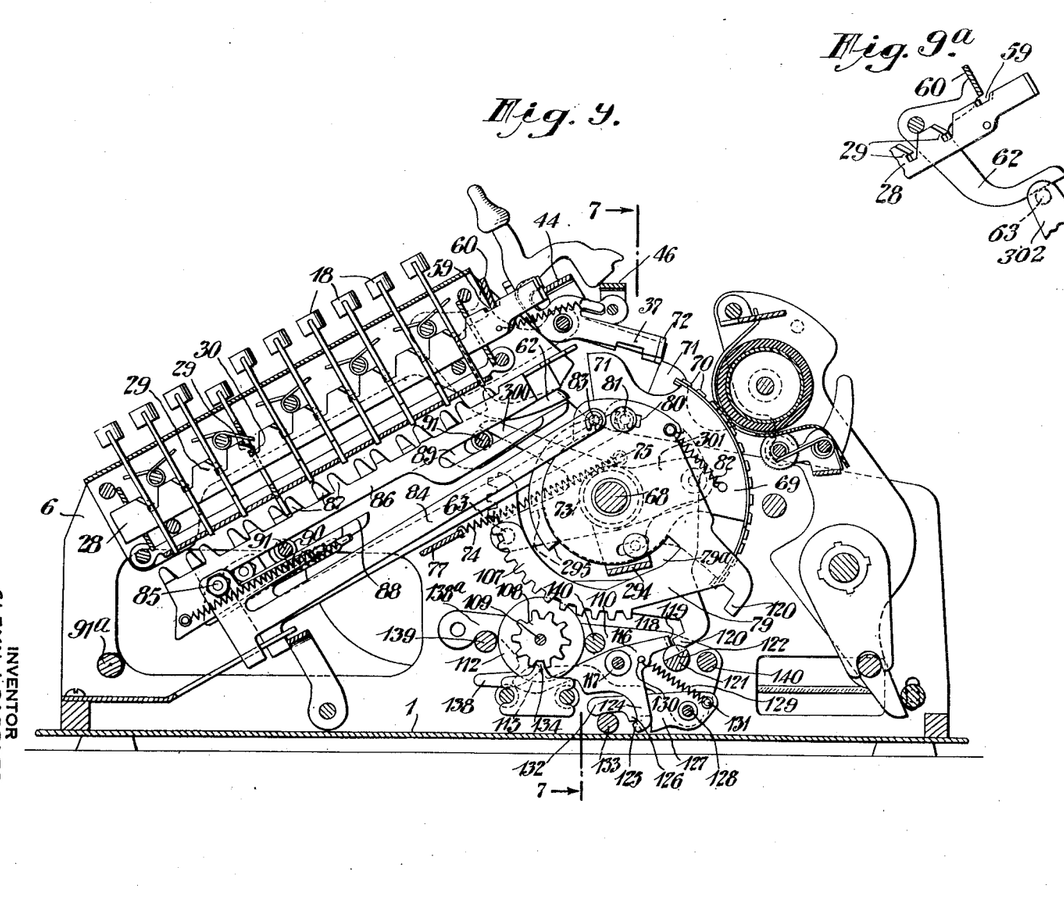
Fig. 9 a vertical longitudinal sectional view of the machine, with the working parts positioned as at the end of the forward stroke of the handle, and with the outer casing removed.
Figures 10, 11:
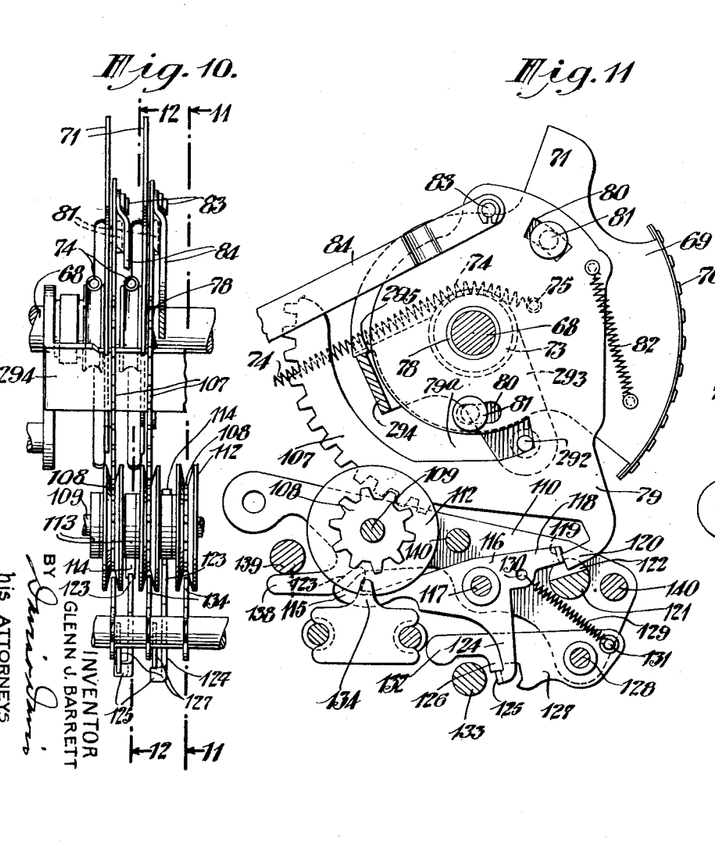
Fig. 10 a front elevation of an accumulator unit and an adjacent accumulator driving unit.
Fig. 11 a detail view on the line 11—11 of Fig. 10 with the accumulator wheel at zero.

After the transfer of the tens, which takes place at the end of a return stroke of the handle 126, it is necessary to reset the carrying levers 116 before the next return stroke of the handle, and this resetting is done during the forward stroke of the handle. As the accumulator rocking frame 110 is moved downward to disengage the register wheel pinions 108 from the adding sector racks 107, the forward ends 132 of the latch pawls 127 are adapted to engage a transversely disposed fixed rod 133 on the main frame to rock the latch pawls upward relatively to the accumulator rocking frame from the position shown in Fig. 12 to the position shown in Fig. 9 and thereby release the transfer levers 116 and permit them to return to normal position by the pull of the springs 129 as indicated in Fig. 9, provided the detent fingers 120 have been pushed back, as hereinafter described. When the register wheel pinions 108 are again moved into mesh with the adding sectors there will be no possibility of displacement of pinions by the carrying levers, for both move together with the rocking frame 110.

During the differential positioning movements of the adding sectors in accordance with the setting of the numeral keys, on the forward stroke of handle 196, the register wheel pinions 108 are moved out of mesh with the adding sector racks 107 and therefore the register wheels, being freely rotatable, are liable to become displaced. To obviate this, fixed detents 134 are preferably located below the register wheels for engaging between teeth of the register wheel pinions 108 when the latter are moved out of mesh with the adding sectors. The detents 134 are provided with tooth-like noses adapted to project upward between the guide disks 117 of the register wheel pinions so as to properly align with and enter between teeth of the register wheel pinions 108. In order to limit the vibrating or rocking movement of the accumulator rocking frame 110 when the register wheel pinions 108 are moved into and out of mesh with the racks 107 of the adding sectors, the side bars 110 of the rocking frame are provided with forked ends, the lower forwardly projecting fingers 138 of which are adapted to engage a fixed transverse rod 139 supported in the main frame side plates 5 and 6 to limit the movement of the pinions toward the adding sector racks, and the upper forwardly extending parts 138ª of which are adapted to engage said rod 139 to limit the movement of the pinions and accumulator rocking frame downward when the register wheel pinions are withdrawn from the adding sectors. The side bars 110 of the accumulator rocking frame are preferably secured rigidly together by transverse stay rods 140, the ends of which are riveted to the respective side bars 110, but the transverse rods 109, 117 and 128, supporting respectively the register wheels, the carrying levers and the latch pawls, are secured in the rock frame.

*Control mechanism*

The general operating handle 196, which is adapted to operate the machine for adding after numeral keys have been set in the keyboard, or to operate the machine for taking the total when desired, is preferably provided with a hub 197 removably attached to the end of the main shaft 68 by means of a screw 198 passing through a hole in the hub, the screw being threaded into the end of the main shaft 68. The right-hand end of the main shaft 68 has a hub 199 of a cam disk 201 secured thereto by a pin 200, the outer end of the hub being cut away to form a tongue adapted to cooperate with a transverse slot on the handle hub 197 to ensure the rotation of the shaft 68 when the handle 196 is operated. The cam disk 201 which oscillates with main shaft 68 is provided with an arcuate slot at 202, the ends of which are adapted to cooperate with a laterally projecting stud 203 secured in the main frame side plate 5 to limit the forward and return throw of the handle. The peripheral edge of the cam disk 201 is formed to provide a cam edge portion 205 and a dwell edge portion 215 adapted to cooperate with a friction roller 206 to rock and hold down a rock arm 209. Roller 206 is mounted on the upper end of a lever 207 pivoted at 208 to the rock arm 209 which is secured to the end of the rock shaft 121 upon which the accumulator rocking frame 110 is mounted, as previously described. The forward end 210 of the rock arm 209 is provided with a laterally projecting stud or pin 211 extending inward through a slot 212 in the main frame side plate 5. The inner end of the stud 211 passes through a hole in the forward end of the right-hand side bar 110 of the accumulator rocking frame and is secured to said bar 110 by a nut 213ª, thereby tying the accumulator rocking frame to the rock arm 209 so that any movement of the latter will be transmitted to the rocking frame. A spring 214 secured to the stud 211 and to the fixed rear transverse frame rod 91 is adapted to normally lift the accumulator rocking frame and hold the register wheel pinions 108 in mesh with the adding sector racks 107.

Figure 1:
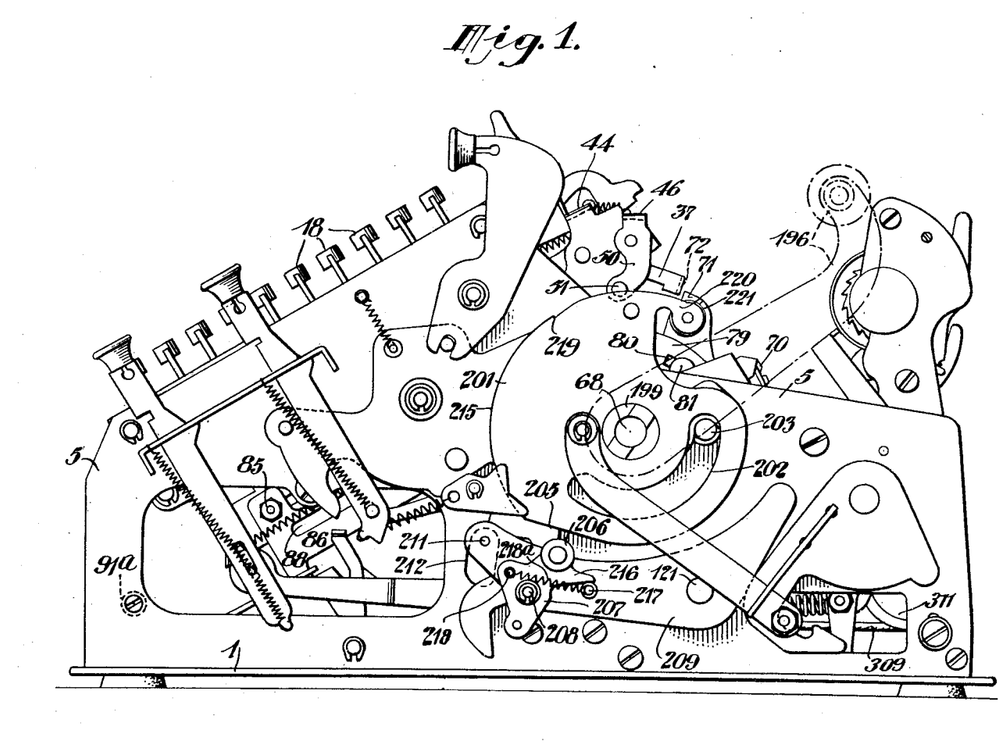
Fig. 1 is a side elevation of the machine, with the outer casing removed, as viewed from the right hand side of the machine, the working parts standing in normal idle position.

By the construction just described, it will be seen that during adding operations when the handle is drawn forward the cam edge portion 205 of cam disk 201 will engage the friction roller 206 and move the rock arm 209 downward, and when the roller passes onto the dwell edge portion 215 of the cam disk the latter will maintain the register wheels out of mesh until the end of the forward stroke of the handle. The friction roller lever 207 is provided with a rearwardly projecting stop lug 216 engaging a pin 217 mounted on the rock arm 209, and a spring 218ª, extending from the pin 217 to a pin 218 secured to the lever 207, is adapted to normally hold the friction roller lever in the position shown in Fig. 1, with the lug 216 in contact with the pin 217. It will be seen, however, that the line of thrust of the cam disk through the friction roller 206 and the pivot 208 of the lever 207 at the end of the forward stroke of the handle is such that, as soon as the cam disk 201 starts on its return movement as the operating handle starts back, the friction roller 206 will be pushed to the left beyond the line of thrust and, under the action of the spring 214, the accumulator rock frame will be snapped back into normal position and the register pinions 108 will again mesh with the adding sector racks. Ordinarily the frictional engagement between the roller 206 and the dwell edge portion 215 of the cam disk is sufficient to ensure tripping of the lever 207 and moving the roller 206 beyond the line of thrust, but in order to make this action certain the dwell edge portion 215 is preferably provided with a notch 219 which will offer sufficient resistance to the friction roller to ensure carrying of the roller beyond the line of thrust to permit the restoration of the register wheels as previously described.

The cam disk 201 is cut away at its upper rear portion to provide a rearwardly projecting arm 220 normally above the main shaft and carrying a friction roller 221 adapted to engage the laterally projecting pin 51 on the trip lever 50 of bail 46, to rock the bail 44 and release the keys by forward movement of the latch strips 28. On the forward stroke of the handle the friction roller 221 will engage the pin 51 and trip the lever 50 of bail 46 without actuating the bail 44 to release the keys, but on the return stroke of the handle the pin 51 will be engaged by the roller 221 and the two bails 46 and 44 will be rocked forwardly together, and the bail 44 will release the set numeral keys. The roller 221 continuing on the return stroke will pass under the pin 51 to the position shown in Fig. 1 of the drawings, thereby permitting the restoration of the bails 44 and 46 under the action of the latch strip springs 43.

The cam disk 201 is also utilized for operating the platen rocking frame for moving it toward and from the type segments for taking impressions from types aligned in the printing plane, as described in application, Serial Number 50,219.

Figure 5:
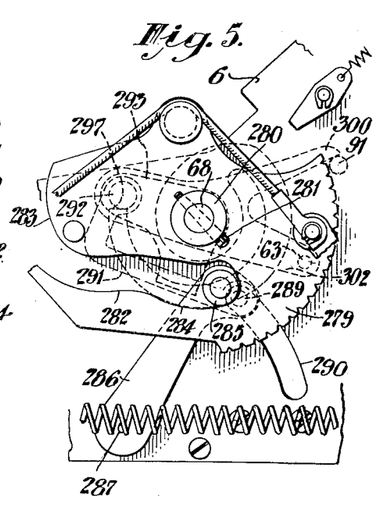
Fig. 5 a view similar to Fig. 3, the working parts being shown as positioned at the end of the forward stroke of the operating handle.
Figure 6:
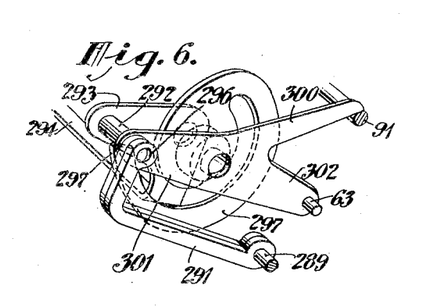
Fig. 6 a perspective view showing details of the restoring bail operating means.
Figure 7:
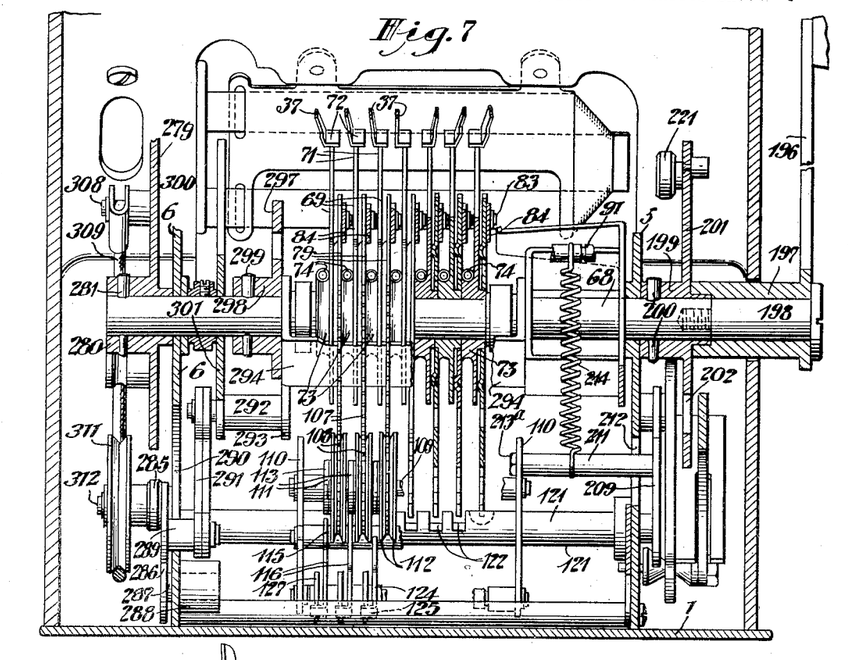
Fig. 7 a transverse vertical sectional view on the line 7—7 of Fig. 9, substantially in the plane of the main shaft, parts of the mechanism being shown in front elevation.
Figure 8:
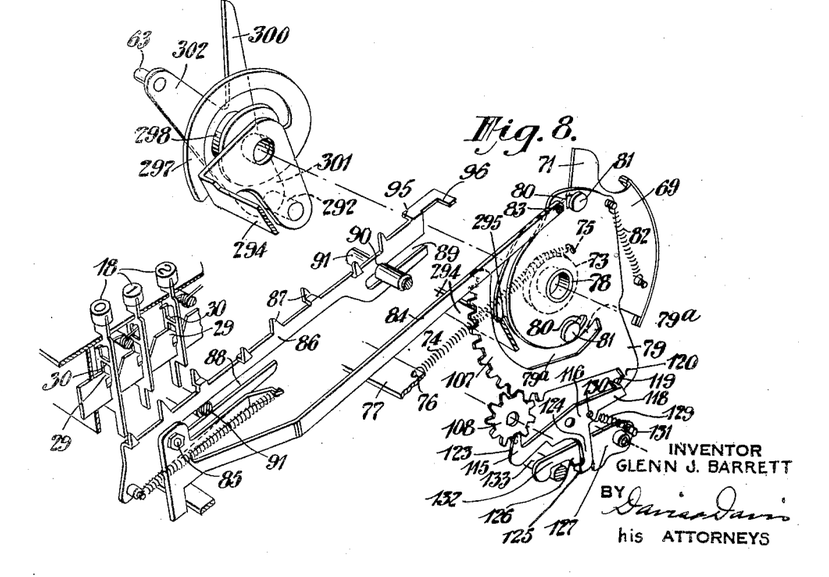
Fig. 8 a perspective view showing a single accumulator-driving or adding unit and associated devices.

The control mechanisms thus far described are located or operated from the right-hand side of the machine, and the control mechanism located on the left-hand side of the machine will be now described. As will be seen in Fig. 2, the left-hand end of the main shaft 68 is provided with a segmental cam plate 279 provided with a hub 280 secured to the shaft 68 by a pin 281. The cam plate 279 is provided with a cam slot 282 of irregular shape, extending from the outer periphery where it is provided with a dwell at 283, inward toward the axis of the shaft 68 where it is provided with a dwell 284. The cam slot 282 is adapted to cooperate with a roller 285 mounted on the forward end of a crank arm 286 extending forward from a stub shaft 287. The latter is rotatably mounted in a bearing boss 288 (see Fig. 7) secured to and projecting inward from the main frame plate 6. The crank arm 286 is preferably provided with an inwardly projecting stud 289, indicated just below the roller in Fig. 7, which projects through an arcuate slot 290 in the frame side plate 6. A pair of connecting links 291 are pivotally connected at their forward ends with the end of the stud 289, as indicated in Figs. 3 and 6, the links extending rearward from said stud and having their rear ends pivotally connected to a stud 292 carried by and projecting from an arm 293 forming part of a universal restoring bail 294 for the accumulator driving units. The restoring bail 294 is rotatably mounted on the main shaft 68 and is normally located in front of the main shaft in position to cooperate with noses or stop edges 295 formed on the type segments 69 which, as previously pointed out, form the driver elements of the adding or accumulator actuating units. When the handle is operated the cam roller 285 will be moved upward toward the center of the shaft 68 by following the cam slot 282, as indicated in Figs. 3 to 5, thereby moving the universal restoring bail 294 counter-clockwise as viewed from the right-hand side of the machine. This will permit the adding sectors to move counter-clockwise as viewed from the right, differentially, according to the number set up on the keyboard, and when the handle returns the bail 294 will pick up the noses 295 of the type segments and restore the type segments to normal position against the action of their springs 74 and restore the adding sectors through the movement of the type segments.

Figure 12:
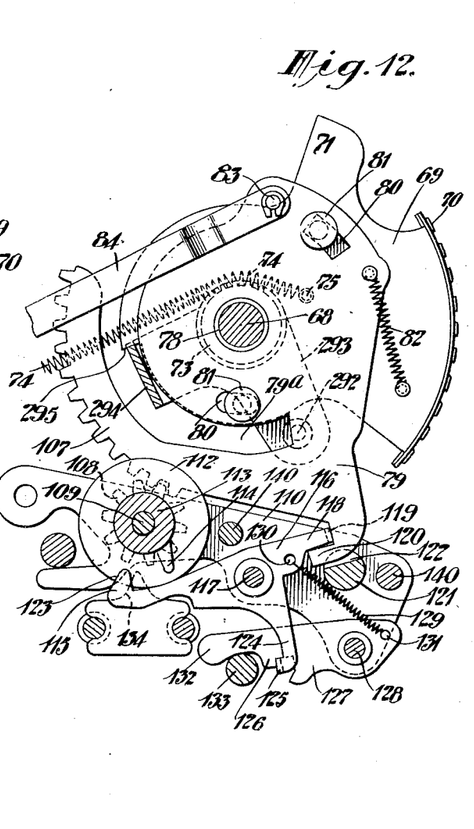
Fig. 12 a view on the line 12—12 of Fig. 10, showing the parts in tens-transfer position.

It will be understood that the throw of the universal bail 294 should be accurately determined, for, on the forward stroke of the handle, the bail should move far enough to permit the adding unit driving elements 69 to move the adding sectors 79 the full nine units or spaces and also, upon its return movement, to bring the driving elements back far enough for key-actuated stop levers 37 to drop in behind the stop noses 71 with the cipher types one space below the printing line and tension the transfer springs 82. In order to ensure accurate adjustment of the positions of the bail 294, both in its normal (return throw) position and at the end of its rearward throw, the two links 291 are preferably employed, which, in the present instance, are made L-shaped as indicated in Fig. 6, so that the short arms thereof may be bent forward or backward to vary the distance between the centers 289 and 292. To facilitate the adjustment the holes in one end of the links 291 are elongated substantially as indicated at 296. It thus will be seen that one link 291 may be bent to determine the location of the universal bail 294 in its normal position, and the other bent so as to determine the location of the bail at the end of its rearward throw. This is an important feature of my improvement, for it eliminates accurate manufacturing operations. An accurate limit for the rearward throw of the bail 294 is desirable, for the bail, which moves in arcuate slots 79ᵃ back of the racks 107, is adapted to engage the adding sectors 79 at the bottom of these slots (Fig. 9) and restore them to normal position, if any of them have been moved forward, as indicated in Fig. 12, for transfer of the tens. This accurate positioning of the adding sectors 79 is required in order to move the fingers 120 at the lower extremities thereof back far enough to permit the ears 119 on the carrying levers 116 to drop down in front of the fingers when the carrying levers are released and restored to normal position, as indicated in Fig. 9.

In order to ensure the full rearward throw of the bail 294, to move the adding sectors 79 the full predetermined limit, as just described, it has been found desirable to provide a positive driving member moving with shaft 68 for moving the bail rearward slightly, if necessary, at the end of the forward stroke of the handle. This driving member preferably comprises a thin sheet metal spiral finger 297 carried by a hub 298 which is secured, by means of a pin 299 (see Fig. 7), to the main handle shaft 68, the end of the finger 297 being adapted, at the end of the forward stroke of the handle, to engage the stud 292 substantially as shown in Fig. 6 and positively move the bail 294 rearward the full limit required. The spiral arrangement of the finger 297 provides for a resilient engagement between the finger and the stud 292 so as to avoid injury to the parts, particularly as a positive stop is provided for limiting the rearward throw of the bail 294. This positive stop for limiting the rearward throw of the bail 294 comprises a finger 300 extending radially (see Fig. 6) of an arm 301 rotatable with the bail upon the main shaft 68 and having its opposite end mounted upon the stud 292 previously referred to as extending laterally from the arm 293 of the bail 294. In this manner the stop arm 300 is movable with the bail and is adapted to limit its movement on the forward stroke of the handle by engaging a fixed stay rod, preferably the rearmost of the rods 91 which, as previously pointed out, support the stop slides 86 of the adding sectors (see Fig. 9). The arm 301 is preferably bifurcated and provided with a second radially projected finger 302 which carries the internally projecting stud or pin 63 (see Fig. 6) adapted to engage the depending arm 62 of a locking bail 60, for holding the latter out of engagement with the notches 59 in the key latch strips 28. It thus will be seen that when the handle is operated on the forward stroke the pin 63 will move out of the field of the rock arm 62, thus permitting the locking bail 60 to drop into the notches 59, as indicated in Fig. 9, to lock the latch strips against accidental unlocking and return to normal position, and the stop finger 300 will engage the transverse rod 91 to limit the rearward throw of the restoring bail 294, the restoring bail being positively moved in its ultimate rearward throw by means of the resilient finger 297, as shown in Fig. 6.

Figure 2:
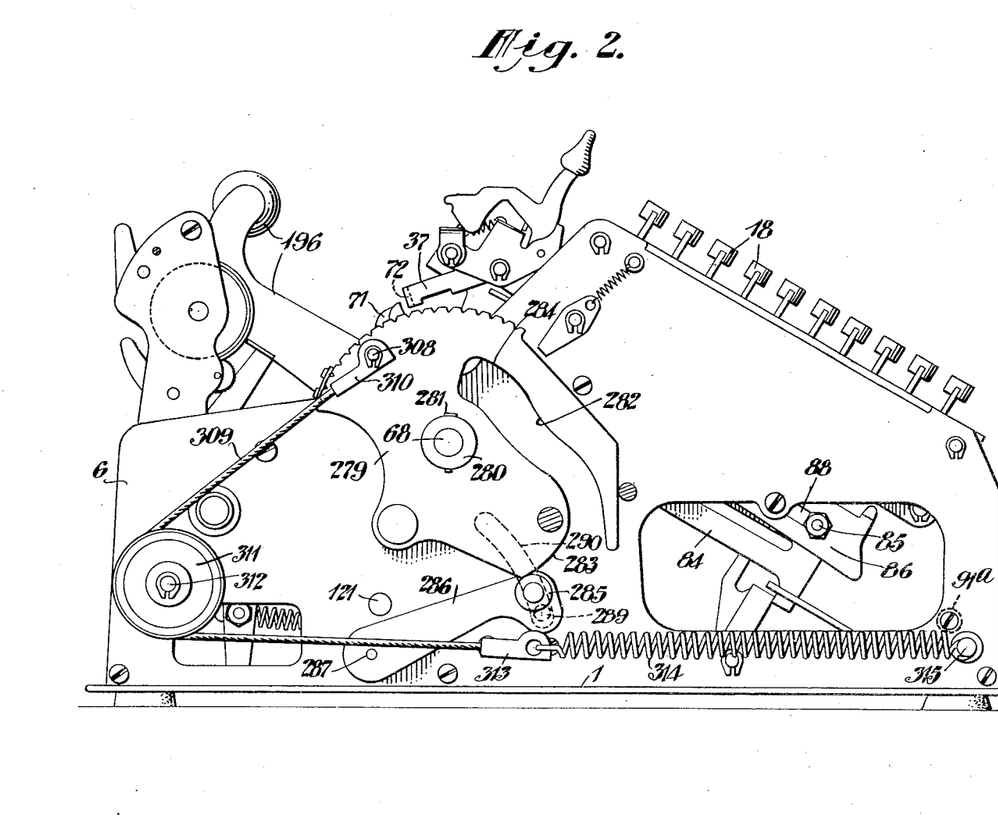
Fig. 2 a side elevation of the machine, with the outer casing removed, as viewed from the left hand side of the machine, the working parts standing in normal idle position and certain of the parts being omitted.
Figure 3:
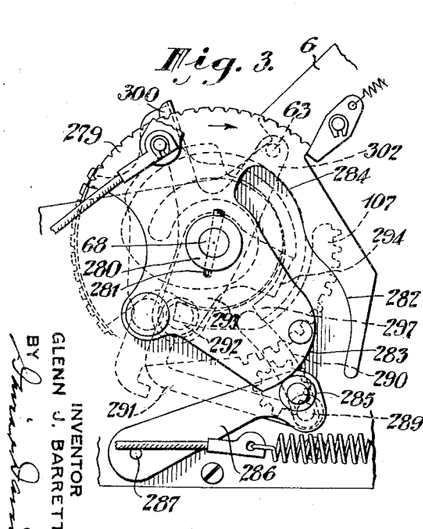
Fig. 3 a fragmentary view showing the restoring bail operating means as viewed from the left hand side of the machine, the working parts being shown as positioned when the operating handle has moved slightly on its forward stroke.

For returning the general operating handle, the cam plate 279 is preferably provided with a laterally projecting stud 308 (see Fig. 2), to the outer end of which a cord or cable 309 is secured by means of an anchor tip 310 pivotally held on the stud and secured to the end of the cable, substantially as indicated in Fig. 2. The cable extends toward the rear of the machine from stud 308 where it passes over a pulley 311 rotatably mounted on a stud 312 projecting laterally from the main side frame plate 6. The cable extends forward from pulley 311 and is provided at its forward end with an anchor tip 313 which is secured to the rear end of a helical spring 314, the front end of which is secured to a stud 315 projecting laterally outward from the main frame side plate 6 near the front end of the machine.

*Operation*

The operation of the various parts has been indicated in the description thereof, but it will be desirable to review briefly the general operation of the machine.

*Addition.*—In normal addition on the machine, keys 18 are depressed in the keyboard according to the digits in the different denominations and, if zeros appear in the number and it is desired that they should be printed on the list, the corresponding zero keys should be depressed. Depression of a selected numeral key in each selected decimal order or denominational key row will move the latch strips 28 associated with said key rows forward until the latch hooks 29 engage over detents 30 of the depressed key stems by reason of partial return movement of the latch strips. Detents 30 prevent full return of the latch strips thereby holding the associated stop levers 37 out of the paths of the detent lugs 71 of the respective adding units, said stop levers being lifted by forward movement of the latch strips and held in inoperative position as long as the keys are locked down.

After the number has been set up on the keyboard, as described, the handle 196 is drawn forward its full stroke, thereby rotating the main handle shaft 68 and the associated control cams. The first effect of drawing forward the handle, for normal addition, is that the cam edge portion 205 of the cam disk 201 will ride over the friction roller 206 and move the accumulator rocking frame to its lowermost position in which register wheel pinions 108 are out of mesh with the adding sector racks 107. Thereafter the dwell edge portion 215 of the cam disk 201 rides over the roller 106 to hold the accumulator frame down throughout the rest of the forward stroke of the handle. Bail 294 begins to swing rearward, after the pinions 108 are demeshed, by reason of dwell 283 of cam disk 279 passing off roller 285 and roller 285 being drawn upward and rearward by the cam portion 282. The operating connection between roller 285 and bail 294 continues to drive the bail rearward until shortly before the end of the forward stroke of the handle when the roller enters the dwell portion 284 of the slot in cam disk 279 and ceases to drive the bail. The rearward movement of the bail permits the differential movement of the respective accumulator driving or adding units released by actuated stop levers 37 according to the keys depressed. In this movement of the active accumulator driving units under the pull of the driving springs 74, the stop slides 86 will move forward until the proper ones of the stops thereon engage the lower or tail ends of the cooperating set keys, to thereby position the type segments and adding sectors to correspond with the number set up in the keyboard. During this operation of bail 294 the driving springs 74 are operative to move all the elements of the active adding units, and the transfer springs 82 are operative to cause a relative movement between the driving elements or type segments 69 and the adding sections 79 of the active units, to the extent of the unit space permitted by the pin-and-slot connections 80—81. At the end of the forward stroke of handle 196, as shown in Fig. 9, the platen will be brought into printing engagement with types 70.

Figure 4:
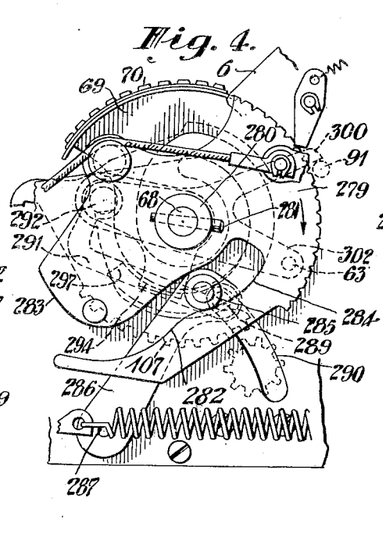
Fig. 4 a view similar to Fig. 3, the working parts being shown as positioned when the operating handle has moved through about half of its forward stroke.

On the forward stroke of the handle the bail 294 is moved rearward, in timed relation with the handle movement as described, by means of the cam slot in the cam 279 on the left side of the machine, engaging the roller 285 as shown in Figs. 3 and 4 and moving the crank arm 286 upward and rearward. The arm 286, through the links 291, will rock the bail from the position indicated in Fig. 3 to that shown in Fig. 4 and, at the end of the forward stroke of the handle, the resilient finger 297 driven positively by shaft 68, by engaging the stud 292, will positively position the bail 294 at the limit of its rearward movement, as determined by the engagement of the stop finger 300 with the rod 91. During the final rearward movement of the bail any of the adding sectors 79 that may have been left in the position shown in Fig. 12 after transfer of the tens on a preceding operation of the machine will be moved counterclockwise as viewed from the right, into normal position, as shown in Fig. 9, so that the ears 119 of the carrying levers 116 may drop down in front of the detent fingers 120, thus restoring the transfer mechanism for the next transfer of the tens.

After the handle 196 has been drawn forward its full stroke it is released and will be snapped back to normal position by spring 314. Upon the return stroke of the handle the cam disk 201 first moves the friction roller lever 207 over the left thereby permitting the accumulator rocking frame to snap back to normal position under the action of its register lifting spring 214. This places the register wheel pinions 108 again in mesh with the adding sector racks 107 for accumulation of the set-up number into the total. The bail 294 remains idle during remeshing of the pinions and racks, by the return movement of the cam plate 279 from the position shown in cam 5 to that shown in Fig. 4, and will be restored to normal position as roller 285 passes over the active cam portion 284 of the slot in cam 279, thereby engaging noses 295 of the type segments 69 and restoring the active adding units to normal position, except in the rows where adding sectors are released for transfer of tens. In the latter rows the adding units will return to the position shown in Fig. 12. On the return stroke of the handle the roller 221 on the cam disk 201 will, near the end of the stroke, engage pin 51 and rock universal bail 44 forward to move the latch strips 28 and release any keys set in the keyboard.

The transfer of the tens on the return stroke of the handle is effected by the triggers 114 engaging the noses 115 of the carrying levers 116 to the left of the respective register wheels accumulating more than nine and moving them down to the position shown in Fig. 12, thereby lifting the ears 119 out of the field of the corresponding detent fingers 120. If the adding unit to the left is in normal position, that is no number has been set up in that column of keys. the spring 82 will immediately move the adding sector 79 to the position shown in Fig. 12, thereby moving the corresponding register wheel an additional unit distance for the transfer of the tens. If, however, the corresponding adding unit has been advanced as indicated in Fig. 9, it will be necessary to hold the carrying lever 116 in its actuated position until the corresponding adding unit has been returned to normal position, to thereby permit the adding sector 79 to assume the transfer position shown in Fig. 12. For this purpose the latch pawls 127 are provided for latching the carrying levers 116 in actuated position and will retain them in this position until the next forward operation of the handle. On the succeeding forward operation of the handle the accumulator rocking frame is again withdrawn from cooperation with the adding sectors and the latches 127 will be lifted to release the carrying levers, by engagement of the latch pawls with the fixed bar or rod 133, substantially as shown in Fig. 9.

What I claim is:

1. In a key-set adding machine, the combination with a transversely extending main shaft carrying adding sectors and type segments; a universal bail rotatably mounted on said main shaft and normally holding said adding sectors and type segments in normal position against rotation by their driving spring when released; a handle mounted on the main shaft; and means operated on the forward stroke of the handle to move the universal bail to free the adding sectors and type segments for movement by their driving springs, and operated on the return stroke of the handle to restore the sectors and segments to normal position and to place the driving springs under tension.

2. In a key-set adding machine, the combination with a handle-operated main shaft carrying adding sectors and type segments; a universal bail rock frame rotatably mounted on said main shaft said bail in its normal at-rest position being adapted to engage said type segments and thereby hold the type segments and adding sectors in their normal positons; a crank arm; means connecting said arm to the bail rock frame; a disc mounted on the main shaft and formed with a cam slot; means on the crank arm operating in said slot to swing the bail rock frame to free the type segments on the forward stroke of the handle and to restore the type segments and adding sectors to normal position on the return stroke of the handle.

3. In a key-set adding machine, the combination with a handle-operated main shaft carrying adding sectors and type segments; a universal bail rock frame rotatably mounted on said main shaft said bail in its normal at-rest position being adapted to engage said type segments and thereby hold said segments in their normal non-printing position; a crank arm; means connecting said arm to the bail rock frame; a disc mounted on the main shaft and formed with a cam slot; means on the crank arm operating in said slot to swing the bail rock frame to free type segments and adding sectors on the forward stroke of the handle and to restore the type segments and adding sectors to normal position on the return stroke of the handle; and a stop arm carried by the bail rock frame and adapted to engage a fixed stop for limiting the movement of the said rock frame on the forward stroke of the handle.

4. In a key-set adding machine, the combination with a handle-operated main shaft carrying adding sectors and type segments; a universal bail rock frame rotatably mounted on said main shaft said bail in its normal at-rest position being adapted to engage stops on the type segments and thereby hold said type segments and associated adding sectors in their normal positions; a crank arm; two parallel L-shaped links connecting said arm to the bail rock frame, said links being provided with oppositely disposed elongated holes in the toe of the L cooperating with a pin connected to the rock frame; a disc mounted on the main shaft and formed with a cam slot; and means on the crank arm operating in said slot to swing the bail rock frame to free the type segments and the adding sectors on the forward stroke of the handle and to restore them to normal position on the return stroke of the handle.

5. In a key-set adding machine, the combination with a handle-operated main shaft carrying adding sectors and type segments, a universal bail rock frame rotatably mounted on said main shaft said bail in its normal at-rest position being adapted to engage stops on the type segments and thereby hold said segments in their normal non-printing position, tens transfer means for limiting the return movement of the adding sectors, means actuated by said handle shaft for moving said universal bail to free the type segments on the forward stroke of the handle and to restore them to normal position on the return stroke of the handle, the adding sectors being arrested by the tens transfer means before the type segments have been fully restored to normal position.

6. In a key-set adding machine, the combination with a handle-operated main shaft carrying adding sectors and type segments, oscillating means rotatably mounted on said main shaft said means in their normal at-rest position being adapted to engage stops on the type segments and thereby hold said segments in their normal non-printing position, means actuated by said handle shaft for moving said oscillating means to free the type segments on the forward stroke of the handle and to restore them to normal position on the return stroke of the handle, the adding sectors being arrested before the type segments have been fully restored to normal position.

7. In a key-set adding machine, the combination with a handle-operated main shaft carrying adding sectors and type segments, a universal bail rock frame rotatably mounted on said main shaft said bail in its normal at-rest position being adapted to engage stops on the type segments and thereby hold said segments in their normal non-printing position, a crank arm, means connecting said arm to the bail rock frame, a disc mounted on the main shaft and formed with a cam slot, means on the crank arm operating in said slot to swing the bail rock frame to free the type segments on the forward stroke of the handle and to restore them to normal position on the return stroke of the handle, a stop arm carried by the bail rock frame and adapted to engage a fixed stop for limiting the movement of the bail on the forward stroke of the handle, a resilient finger rigidly secured to the main shaft and adapted to engage the bail rock frame at the end of the forward stroke of the handle to positively force the bail the required distance to reset the adding sectors at normal and to give full forward movement of the type segments.

8. In a key-set adding machine, the combination with a handle-operated main shaft carrying adding sectors and type segments, stop levers for holding said type segments in normal non-printing position, a universal bail rock frame rotatably mounted on said main shaft said bail in its normal at-rest position being adapted to engage stops on the type segments and thereby hold said segments in their normal non-printing position, means actuated by said handle shaft for moving said universal bail to free the type segments on the forward stroke of the handle, and to restore them to normal position on the return stroke of the handle, means for locking all of the said stop levers at the beginning of the forward stroke of the handle, and means carried by the bail rock frame for releasing said stop lever locking means at the end of the return stroke of the handle.

In testimony whereof I hereunto affix my signature.

GLENN J. BARRETT.